March 16, 1943. C. C. SCHEELE 2,314,315
RUBBER COUPLING
Filed Nov. 27, 1941

INVENTOR
CHARLES C. SCHEELE
BY Theodore E. Simonton
ATTORNEY

Patented Mar. 16, 1943

2,314,315

UNITED STATES PATENT OFFICE 2,314,315

RUBBER COUPLING

Charles C. Scheele, Syracuse, N. Y., assignor to Easy Washing Machine Corporation, Syracuse, N. Y., a corporation of Delaware Application November 27, 1941, Serial No. 420,710

2 Claims. (Cl. 285—54)

My invention is concerned with improvements in couplings, and especially to that class of couplings used for connecting pipes or tubes to the drainage outlets of tubs, wash basins and the like. These connections are generally referred to in the trade as coupling glands.

The coupling gland of my invention is preferably made from rubber that is sufficiently flexible to be forced into the drain opening of the tub or basin and yet sufficiently stiff to retain its shape when in place. A suitable rubber has a durometer reading of between 60 and 65. Although this may be the preferred grade, it is well within the contemplation of my invention to go beyond this range, being limited only by the physical characteristics specified above.

The objects of my invention may be briefly summarized as follows:

To provide a coupling gland that is simple in design, cheap to manufacture, easily assembled in the outlet opening, and leak-tight in use.

Other objects and advantages of my invention will become apparent from the following description taken in conjunction with the drawing, in which.

Figure 5:
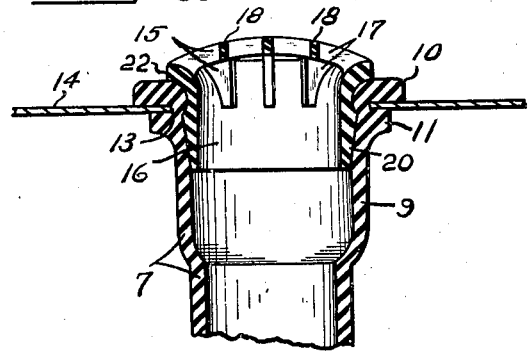
Figure 5 is a section, parts being broken away, taken on the line 5—5 of Figure 1 showing the assembled relation of the coupling, tube strainer, and tub bottom.

Referring now to the drawing, 6 is a sheet metal tub of the type commonly used in washing machines. The coupling 7 is moulded from rubber having the characteristics described above. In the form illustrated, an extension 8 is molded integrally with the coupling 7. The extension may be of any desired length and shape, and is adapted to be slipped over a metal tube or pipe to make a tight connection therewith. The body portion 9 of the coupling 7 is provided with an outwardly extending circular flange 10 molded integrally with the coupling and located adjacent the open end thereof. A second flange 11 is likewise molded integrally with the body portion 9 and is located adjacent the flange 10, the flanges 10 and 11 being positioned to provide the narrow groove 12 between them. The diameter at the base of the groove 12 is substantially equal to the diameter of the outlet hole 13 in the bottom of the tub 6. The width of the groove 12, that is the distance between the flanges 10 and 11, is substantially equal to or slightly smaller than the thickness of the tub bottom 14. The relationship of the flanges 10 and 11 and the groove 12 is quite similar to the relationship and construction of an ordinary rubber grommet and is assembled in the tub in the same fashion as a grommet would be inserted. This may be accomplished by putting the tube 8 through the hole 13 first, pulling the coupling down into the hole 13, forcing the flange 11 through the opening 13 and then permitting the coupling to expand so that the tub bottom 14 is positioned between the flanges 10 and 11 in the groove 12, as shown in Figure 5.

Figure 1:
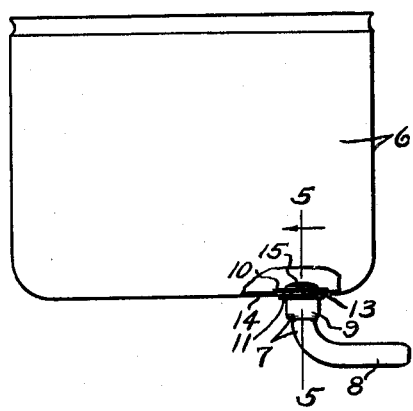
Figure 1 shows a side view of the coupling gland of my invention assembled in a tub, part being broken away and part being in section to show the relation of the coupling to the tub.
Figure 2:
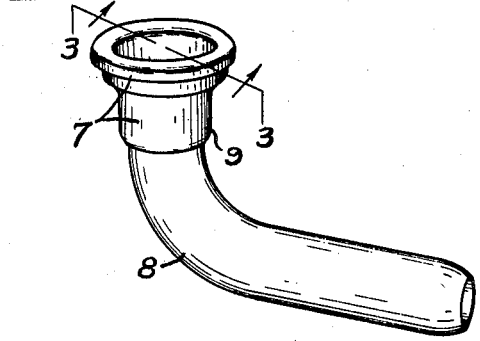
Figure 2 is a perspective view of a rubber coupling embodying the principles of my invention.
Figure 4:
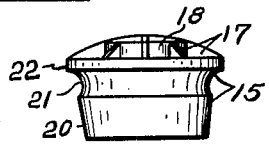
Figure 4 is a side elevation of the tube strainer used with my coupling to secure the coupling in place.
Figure 3:
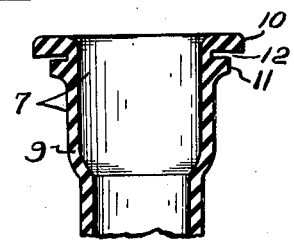
Figure 3 is a section, part being broken away, taken on the line 3—3 of Figure 2.

In order to obtain a leak-tight connection and to prevent the accidental displacement of the coupling gland, I have provided a combination securing member and strainer 15. The member 15 is preferably made of hard rubber or molded plastic, but it may be made from brass, aluminum or die casting metal. The member 15 is provided with a through central bore 16 which is partially closed at the upper end by a plurality of radially extending ribs 17. A reinforcing circular rib 18 of less diameter than the bore 16 is supported by the ribs 17. The combination of the ribs 17 and 18 forms a strainer to prevent material from entering the drain which otherwise might clog it. The particular arrangement of the ribs 17 and 18 is not important, and the arrangement can be changed without affecting the invention in any way. The lower portion 20 of the member 15 is tapered, as shown in Figure 4, to facilitate the entry of the member into the body portion 9. A circumferential groove 21 is provided in the member 15 adjacent the upper end thereof, the upper edge of the groove 21 merging into the flange 22 which is substantially larger in diameter than the bore of the body portion 9. After the body portion 9 has been assembled in the tub outlet opening 13, the member 15 is pressed downwardly into the bore of the body member and assumes the position shown in Figure 5. The proportions of the member 15 are such that when it is pushed into the bore of the body member 9 it expands the same so as to make a tight connection with the periphery of the opening 13. The circumferential groove 21 is so shaped as to expand the portion of the body member which is backed by the flange 10 so as to force the flange 10 outwardly and downwardly against the bottom of the tub. The groove 21, in conjunction with the tapered portion 20, is so shaped and proportioned as to expand the portion of the coupling body which is backed by the flange 11 so as to force the flange 11 outwardly and upwardly against the tub bottom. Thus the groove 21 performs a double function. It exerts pressure on the flanges 10 and 11 in such manner that they tend to close the groove 12, and likewise the groove 21 serves to hold the member 15 firmly in position after it has been pushed home.

I have found that a coupling gland made in accordance with my disclosure will create a liquid-tight seal between the tub or basin and the coupling. Furthermore, my coupling gland eliminates the screw threads and gaskets which the ordinary metal coupling gland requires and greatly simplifies the work of assembling the coupling in the tub opening. This results not only in simplicity of manufacture but a great saving in assembling the coupling in the tub or basin.

I claim:

1. A coupling gland for making a connection to a circular aperture in a thin walled vessel, said gland comprising a coupling member made of flexible rubber or the like and a securing member made of rigid material, both of said members being provided with through central bores, said coupling member comprising a tubular body portion, an outwardly extending flange at one end of said body portion and a second outwardly extending flange located adjacent said first or end flange, said flanges being adapted to lie against the opposed surfaces of the vessel wall adjacent said aperture and cooperating to define a narrow groove having a width substantially equal to the thickness of said vessel wall and having a diameter at its base substantially equal to the diameter of said aperture, said securing member comprising an exterior tapered portion and a flange adjacent the large end of said tapered portion, said securing member flange being substantially larger in diameter than the bore of said coupling member, said securing member being adapted to be forced into said coupling member with the inside of said securing member flange bearing against the outside of said end flange of said coupling member, and said securing member being so constructed and arranged as to force the flanges of said coupling member outward and toward each other to grip the vessel wall and as to cooperate with said coupling member and the vessel wall to hold said securing member in place.

2. A coupling gland for making a connection to a circular aperture in a thin walled vessel, said gland comprising a coupling member made of flexible rubber or the like and a securing member made of rigid material, both of said members being provided with through central bores, said coupling member comprising a tubular body portion, an outwardly extending flange at one end of said body portion and a second outwardly extending flange located adjacent said first or end flange, said flanges being adapted to lie against the opposed surfaces of the vessel wall adjacent said aperture and cooperating to define a narrow groove having a width substantially equal to the thickness of said vessel wall and having a diameter at its base substantially equal to the diameter of said aperture, said securing member comprising an exterior tapered portion, a circumferential retaining groove at the large end of said tapered portion and a flange at the other side of said groove and into which said groove merges, said securing member flange being substantially larger in diameter than the bore of said coupling member and the large end of said tapered portion being slightly larger in diameter than the bore of said coupling member, said securing member being adapted to be forced into said coupling member with the inside of said securing member flange bearing against the outside of said end flange of said coupling member and with said tapered portion positioned on the opposite side of the vessel, and said securing member being so constructed and arranged that its flange, retaining groove and tapered portion cooperate to force the flanges of said coupling member outward and toward each other to grip the vessel wall and that said retaining groove cooperates with said coupling member and the vessel wall to hold said securing member in place.

CHARLES C. SCHEELE.